(12) United States Patent
Aristoff (10) Patent No.: US 8,909,588 B2
(45) Date of Patent: Dec. 9, 2014

(54) METHOD AND SYSTEM FOR PROPAGATING THE STATE OF AN OBJECT AND ITS UNCERTAINTY

(75) Inventor: Jeffrey M. Aristoff, Fort Collins, CO (US)

(73) Assignee: Numerica Corp., Loveland, CO (US)

(*) Notice: Subject to any disclaimer, the term of this patent is extended or adjusted under 35 U.S.C. 154(b) by 302 days.

(21) Appl. No.: 13/611,665

(22) Filed: Sep. 12, 2012

(65) Prior Publication Data

US 2014/0074766 A1    Mar. 13, 2014

(51) Int. Cl.
*G06N 5/02* (2006.01)
*G06F 17/13* (2006.01)

(52) U.S. Cl.
CPC . *G06N 5/02* (2013.01); *G06F 17/13* (2013.01)
USPC .......................................................... 706/52

(58) Field of Classification Search
None
See application file for complete search history.

(56) References Cited

U.S. PATENT DOCUMENTS

| | | | | |
|---|---|---|---|---|
| 6,829,568 | B2* | 12/2004 | Julier et al. | 702/189 |
| 6,859,170 | B2* | 2/2005 | Devereux et al. | 342/357.29 |
| 7,739,081 | B1* | 6/2010 | Kierzenka et al. | 703/2 |
| 2003/0144824 | A1* | 7/2003 | Yang et al. | 703/14 |
| 2010/0054565 | A1* | 3/2010 | Quinto et al. | 382/131 |
| 2010/0243431 | A1* | 9/2010 | Kuboi et al. | 204/192.33 |
| 2012/0197617 | A1* | 8/2012 | Mujagic et al. | 703/7 |

OTHER PUBLICATIONS

Aristoff et al, Implicit Runge-Kutta Methods for Uncertainty Propagation, 2012.*
Bradley et al, A New Numerical Integration Technique in Astrodynamics, 2012.*
Horwood et al, Adaptive Gaussian Sum Filters for Space Surveillance, 2011.*
Horwood et al, Orbital State Uncertainty Realism, 2012.*
Jones, Orbit Propagation Using Gauss-Legendre Collocation, 2012.*

* cited by examiner

*Primary Examiner* — Jeffrey A Gaffin
*Assistant Examiner* — Mikayla Chubb
(74) *Attorney, Agent, or Firm* — Kilpatrick Townsend & Stockton LLP (57) ABSTRACT

Embodiments of the present invention are directed to reducing the computational cost of propagating the uncertainty in the state of an object, which requires the numerical solution of an initial value problem (IVP) ensemble, by means of a computer. The present invention uses an implicit-Runge-Kutta-based (IRK) method that exploits the proximity of the initial conditions within the IVP ensemble. More specifically, one of the IVPs can be solved over a given time span consisting of one or more time steps with an IRK method, and the resulting trajectory can be recorded. The system of equations that arises on each time step of the IRK method can be solved using various iterative methods. The remaining IVPs can be solved over the same timespan using the same IRK method and time steps, together with the recorded trajectory from the first propagation.

36 Claims, 7 Drawing Sheets

METHOD AND SYSTEM FOR PROPAGATING THE STATE OF AN OBJECT AND ITS UNCERTAINTY

STATEMENT AS TO RIGHTS TO INVENTIONS MADE UNDER FEDERALLY SPONSORED RESEARCH AND DEVELOPMENT

This invention was made with government support under Contract No. FA9550-12-C-0034 awarded by the Air Force Office of Scientific Research to Numerica Corporation. The government has certain rights in the invention.

FIELD OF THE INVENTION

Embodiments of the present invention relate to propagating the state of an object and its uncertainty. More particularly, embodiments of the present invention relate to reducing the time or amount of computation required for solving an ordinary differential equation having an ensemble of initial conditions as arises in, for example, sequential state estimation, conjunction analysis, maneuver detection, and sensor resource management.

BACKGROUND OF THE INVENTION

Space Situational Awareness (SSA) includes knowledge of the near-Earth space environment which can be accomplished through the tracking and identification of Earth-orbiting space objects to protect space assets and maintain awareness of potentially adversarial space deployments. Fundamental to the success of the SSA mission is the rigorous inclusion of uncertainty in the space surveillance network (SSN). The proper characterization and robust quantification of uncertainty is a common requirement to many SSA functions including tracking and data association, resolution of uncorrelated tracks (UCTs), conjunction analysis and probability of collision, sensor resource management, and anomaly detection. Other fields of endevour in which estimating the state of an object and its uncertainty include but are not limited to aeronautics and aviation, air and missile defense, etc.

The general framework for the problem of estimating the state of an object and its uncertainty (i.e., its probability density function) in the presence of uncertainty in the dynamics, model parameters, and initial conditions is that of the general Bayesian nonlinear filter. The Kalman filter optimally characterizes the state and uncertainty in the linear Gaussian case and the extended Kalman filter approximately characterizes the state in the Gaussian and (mildly) nonlinear case. Higher order filters can also be employed to improve the characterization of the state. The uncertainty propagation component of these filters uses the Ricatti equation or a higher order Ricatti equation (e.g., the covariance matrix associated with the extended Kalman filter is obtained as a solution of the Ricatti equation).

A different class of methods starts from the representation of the initial probability density function by a set of particles or states, propagates the ensemble of particles through the differential equation defining the dynamics (i.e., the time evolution of the particles or states) over some period of time, and then recovers the characterization of uncertainty at the end time. Mathematically speaking, the propagation of a given state amounts to solving an initial value problem (IVP). The particles can be chosen randomly through sampling techniques as in Monte Carlo methods (e.g., particle filters) or deterministically as in the unscented transform of the unscented Kalman filter or higher order methods based on Gauss-Hermite quadrature. Gaussian sum filters and generalizations using mixtures can also utilize the unscented Kalman filter as the basis for propagating the individual probability density functions. Grid methods represent the uncertainty through the propagation of particles and the subsequent recovery of the uncertainty. Ultimately, either the Fokker-Planck equation (for continuous time dynamics) or Chapman-Kolmogorov equation (for discrete time dynamics) govern the evolution of the probability density function. In the former, this parabolic partial differential equation can be solved by the method of lines in which the spatial variables are discretized with the time variables remaining continuous, resulting in an ensemble of IVPs. Finally, in addition to the general nonlinear Bayesian filter, the Probability Hypothesis Density filter and its generalization, the Cardinalized Probability Hypothesis Density filter can make use of Monte Carlo methods with the corresponding propagation of an ensemble of particles. Thus, a large class of methods for propagating a state and its uncertainty require the propagation of an ensemble of particles or states through the nonlinear dynamics. Once recovered and characterized, the uncertainty can be used to update the nonlinear filter, to compute a likelihood function or ratio for data association, to compute a probability of collision in conjunction analysis, to assist with the detection of anomalies such as maneuvers, and to provide state uncertainty for sensor resource management.

Traditional algorithms for propagating an ensemble of states are based on explicit numerical methods. As such, they solve each IVP independently from one another, regardless of the proximity of the initial conditions, by calculating the state of a system at a later time from the state of the system at an earlier time. Hence, even if two initial conditions differed by an infinitesimal amount and the solution to the first IVP is known because it had already been computed, current approaches would not be able to exploit this information in order to solve the second IVP in a more computationally efficient manner. Since the IVPs that arise in uncertainty propagation usually contain initial conditions that are closely spaced about some estimate of the current state, approaches are needed that can reduce the computational cost of uncertainty propagation by exploiting such proximity.

BRIEF SUMMARY OF THE INVENTION

Embodiments of the present invention are directed to reducing the computational cost of propagating the uncertainty in the state of an object, which requires the numerical solution of an initial value problem (IVP) ensemble, by means of a computer. The present invention is an implicit-Runge-Kutta-based (IRK) method to solve the above problem that exploits the proximity of the initial conditions within the IVP ensemble.

More specifically, one of the IVPs can be solved (over a given time span consisting of one or more time steps) with an IRK method, and the resulting trajectory (i.e., the state of the object throughout the propagation) can be recorded. The system of equations that arises on each time step of the IRK method can be solved using standard iterative methods (e.g., fixed-point methods, Newton's method or one of its variants). The remaining IVPs can be solved (over the same timespan) using the same IRK method and time steps, together with the recorded trajectory from the first propagation. Because the recorded trajectory from the first propagation and the unknown trajectories are close in proximity, convergence of the iterations within the IRK method is faster than had a trivial guess for the trajectory been provided. Moreover, the error need not be re-estimated, and steps need not be rejected. Hence, the computational cost of propagating each of the remaining states is significantly reduced. Uncertainty in the object's state can be characterized at a fraction of the cost. The decision-maker has more time to act, or alternatively, the decision-maker can use the tracking or resource management system to handle more complex scenarios in the same amount of time. Exemplary actions taken by the decision-maker can include, but are not limited to, updating a catalog of objects that are being tracked, initiating a maneuver so as to avoid a potential collision between two objects, delaying a launch so-as to avoid launching into a field of debris, or tasking a sensor to look in a particular direction.

Stated another way, propagating the state of an object and an uncertainty associated with the state of the object can comprise receiving an interval of time over which the uncertainty is to be propagated, as well as an ensemble of initial conditions that characterize the initial uncertainty associated with the state of an object and an ordinary differential equation (ODE) describing dynamics of the state of the object, which together define an initial value problem (IVP) ensemble, for the object, the IVP ensemble comprising a plurality of IVPs. The IVPs in the IVP ensemble can be solved and the uncertainty associated with the state of the object at the end of the time interval can be characterized based on solving the IVPs wherein the solution of one or more of the IVPs in the ensemble can depend upon the solution of one or more of the other IVPs in the IVP ensemble. In some cases, the solution of one or more of the IVPs, over one or more time steps, can be used within the process of solving one or more of the remaining IVPs, over one or more time steps. In some cases, one or more time steps taken to solve one or more of the IVPs in the IVP ensemble can be the same as one or more time steps taken to solve one or more of the remaining IVPs in the IVP ensemble. Additionally or alternatively, the solution of one or more of the IVPs, over one or more time steps, can be used within the process of solving one or more of the remaining IVPs, over one or more time steps, and one or more the time steps taken to solve one or more of the IVPs in the IVP ensemble can be the same as one or more time steps taken to solve one or more of the remaining IVPs in the IVP ensemble. According to one embodiment, one or more of the numerical methods used to solve one or more of the IVPs in the IVP ensemble can be an implicit Runge-Kutta (IRK) method. Additionally or alternatively, one or more of the IRK methods can estimate and control the truncation error.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Methods and systems for propagating the state of an object and its associated uncertainty will now be described. One embodiment makes use of a number of mathematical results from numerical analysis. These will be presented first (Section I), followed by a method for propagating the state of a single object (Section II), that together can be used to implement embodiments of the present invention, a detailed description of which follows (Section III). A technique for estimating the error in the propagated state concludes the detailed description of the invention (Section IV).

I—Mathematical Preliminaries

The first-order ordinary differential equation (ODE)

$$y'(t)=f(t,y(t)), \quad (1)$$

together with the initial condition $$y(t_0)=y_0, \quad (2)$$

define an initial value problem (IVP). Many standard problems in dynamics can be converted to this form. The independent variable t (time) is permitted to take on any real value, and the dependent variable y (the state of the object) is a vector-valued function $y: \mathbb{R} \to \mathbb{R}^d$, where d is the dimension of the state. Hence, $f: \mathbb{R} \times \mathbb{R}^d \to \mathbb{R}^d$. An IVP ensemble consists of an ODE and an ensemble of initial conditions. If the ODE contains parameters whose values are unknown, these parameters can be estimated via state augmentation, resulting in a first order ODE as well.

Runge-Kutta methods may be used to solve the IVP given by (1)-(2), that is, to find the state of the object at time $t=t_0+h$. An s-stage Runge-Kutta method can be defined by its weights $b=(b_1, b_2, \ldots b_s)$, distinct nodes $c=(c_1, c_2, \ldots, c_s)$, and s by s integration matrix A whose elements are $a_{ij}$. It can be used to solve the initial value problem given by (1)-(2) over a given time step $t_0$ to $t_0+h$ by writing $$\xi_i = f\left(t_0 + c_i h, y_0 + h \sum_{j=1}^{s} a_{ij}\xi_j\right), i = 1, 2, \ldots, s, \quad (3)$$

where $\xi_i$ are the internal stages, that is, the value of the function f at the intermediate times $t_0+c_i h$ for $i=1, 2, \ldots, s$. Once obtained, the internal stages can be used to advance the solution from $t_0$ to $t_0+h$ according to $$y_1 = y_0 + h \sum_{i=1}^{s} b_i \xi_i. \quad (4)$$

If $a_{ij}=0$ for $i<j$, then (3) is an explicit expression for the internal stages. Otherwise, as with implicit Runge-Kutta (IRK) methods, iterative techniques can be used to solve (3) and an initial guess is made. Examples of fixed-point methods for solving for the internal stages include the Jacobi method, the Gauss-Seidel method, and the Steffensen method. Newton and quasi-Newton methods can also be used. Note that the Runge-Kutta method (A, b, c) can be reformulated so that the s evaluations of f in (4) need not be performed.

Of particular importance in the modeling of the motion of objects subject to forces are equations of the form $$Y''(t)=g(t,Y(t),Y'(t)), \quad (5)$$

which can be written as the first-order ODE (1) where $$y(t) = \begin{pmatrix} Y(t) \\ Y'(t) \end{pmatrix} \quad (6)$$

and $$f(t, y(t)) = \begin{pmatrix} Y'(t) \\ g(t, Y(t), Y'(t)) \end{pmatrix}. \quad (7)$$

In this case, the system of equations defining the internal stages of the IRK method (3) becomes $$\xi_i = Y_0' + h \sum_{j=1}^{s} a_{ij}\xi_j', \quad (8)$$

$$\xi_i' = g\left(t_0 + c_i h, Y_0 + h \sum_{j=1}^{s} a_{ij}\xi_j, Y_0' + h \sum_{j=1}^{s} a_{ij}\xi_j'\right),$$

$$i = 1, 2, \ldots, s,$$

and (4) becomes $$Y_1 = Y_0 + h \sum_{i=1}^{s} b_i \xi_i, \quad (9)$$

$$Y_1' = Y_0' + h \sum_{i=1}^{s} b_i \xi_i'.$$

Substituting the first formula of (8) into the second yields $$\xi_i' = g\left(t_0 + c_i h, Y_0 + \bar{c}_i h Y_0' + h^2 \sum_{j=1}^{s} \bar{a}_{ij}\xi_j', Y_0' + h \sum_{j=1}^{s} a_{ij}\xi_j'\right), \quad (10)$$

and substituting the first formula of (8) into (9) yields $$Y_1 = Y_0 + h Y_0' + h^2 \sum_{i=1}^{s} \bar{b}_i \xi_i', \quad (11)$$

$$Y_1' = Y_0' + h \sum_{i=1}^{s} b_i \xi_i',$$

where $$\bar{a}_{ij} = \sum_{k=1}^{s} a_{ik} a_{kj}, \quad (12)$$

$$\bar{b}_i = \sum_{j=1}^{s} b_j a_{ji},$$

and $$\bar{c}_i = \sum_{j=1}^{s} a_{ij}.$$

Provided that $\bar{a}_{ij}$, $\bar{b}_i$, and $\bar{c}_i$ are pre-computed, these substitutions reduce the storage required by the Runge-Kutta method as well as the computational cost. Similar substitutions can be made for higher-order ODEs to reformulate the associated Runge-Kutta method.

There is extensive literature devoted to the construction and properties of IRK methods. Here, we describe the construction and properties of a class of IRK methods known as collocation-based IRK methods, though the invention need not be restricted to using this particular class of IRK methods. Other implicit Runge-Kutta methods such as diagonally implicit Runge-Kutta methods, also apply.

Without loss of generality, a collocation method can consist of choosing s collocation points (nodes) $c_1, c_2, \ldots, c_s$ in $[-1,1]$ and seeking a function u (with vector coefficients) that obeys the initial condition (2) and satisfies the differential equation (1) at the collocation points. In other words, one seeks a function u such that $$u(t_0) = y_0,$$

$$u'(t_0 + c_i h) = f(t_0 + c_i h, u(t_0 + c_i h)), i = 1, 2, \ldots, s. \quad (13)$$

A collocation method consists of finding such a u and setting $y_1 = u(t_0 + h)$, and can be written as an s-stage IRK method with coefficients $$a_{ij} = \int_{-1}^{c_i} \mathcal{L}_j(\tau) d\tau, \quad (14)$$

$i, j = 1, 2, \ldots, s$ and $$b_i = \int_{-1}^{1} \mathcal{L}_i(\tau) d\tau, \quad (15)$$

$i = 1, 2, \ldots, s,$ where $$\mathcal{L}_i(\tau) = \prod_{l=1, l \neq i}^{s} \frac{\tau - c_l}{c_i - c_l} \quad (16)$$

is the Lagrange interpolating polynomial. This framework allows one to readily construct collocation-based IRK methods such as Gauss-Legendre, Gauss-Chebyshev, and their Radau and Lobatto variants. Generalized Gauss-Legendre IRK methods, and methods wherein the interpolating function need not be polynomial, may be constructed by choosing a family of orthogonal basis functions $\Psi_j$, for $j=1, 2, \ldots, s$ and then computing the coefficients $$a_{ij} = \sum_{\ell=1}^{s} \Psi_{\ell j}^{-1} \int_{-1}^{c_i} \Psi_\ell(\tau) d\tau, \quad (17)$$

$i, j = 1, 2, \ldots, s,$ and $$b_j = \sum_{\ell=1}^{s} \Psi_{\ell j}^{-1} \int_{-1}^{1} \Psi_\ell(\tau) d\tau, \quad (18)$$

$j = 1, 2, \ldots, s,$ where $$\Psi_{ij}^{-1} = [\Psi_j(c_i)]^{-1}, \quad (19)$$

$i, j = 1, 2, \ldots, s$ are the components of the interpolation matrix $\Psi^{-1}$.

An alternative, but mathematically equivalent (in the sense that it produces the same discrete approximation) approach to collocation-based IRK is the following. Rather than working in terms of the values of the function f, one can work terms of the coefficients of a chosen family of basis functions $R_j$ for $j=1, 2, \ldots, s$ (e.g. Chebyshev or Legendre polynomials) by expressing the approximate solution u(t) as $$u(t) = \sum_{j=1}^{s} a_j R_j(t). \quad (20)$$

The vector coefficients $a_j$ are obtained by satisfying the ODE at the collocation points and by satisfying the initial condition (13). The resulting system of nonlinear equations relating the coefficients $a_j$ and the function f can be solved using iterative techniques. We henceforth refer to this approach as a collocation method. We emphasize that it is mathematically equivalent to an s-stage collocation-based IRK method having the same collocation points and basis functions since this fact is sometimes overlooked. The present invention can make use of either approach. However, since collocation methods are a subset of IRK methods, embodiments are described herein with reference to the broader context of IRK.

IRK methods are amenable to interpolation (and extrapolation). The matrix of internal stages $\xi = [\xi_1, \xi_2, \ldots, \xi_s]$, together with the interpolation matrix $\Psi^{-1}$, the elements of which are given by (19), can also be used to determine the state of the object at points that do not necessarily correspond to nodes. This can be done by multiplying $[\Psi_1(c^*), \Psi_2(c^*), \ldots, \Psi_s(c^*)]$ by the interpolation matrix and the result by $\xi$. Since $\Psi^{-1}$ can be pre-computed, interpolation of a single point can be done efficiently.

Let $\hat{y}$ be the exact solution to the initial value problem (1)-(2) at $t=t_0+h$, and let $y_1$ be an approximate numerical solution at $t=t_0+h$, obtained via (4). An s-stage Runge-Kutta method can have order p if the local error $$\|y_1 - \hat{y}\| = 0(h^{p+1}), \quad (21)$$

as $h \to 0$. For an s-stage method to obtain order p, it should satisfy the order conditions B(p), C($\eta$), and D($\zeta$) with $p \leq \eta + \zeta + 1$ and $p \leq 2\eta + 2$, where $$B(p): \sum_{i=1}^{s} b_i c_i^{q-1} = \frac{1}{q} q = 1, 2, \ldots, p; \quad (22)$$

$$C(\eta): \sum_{j=1}^{s} a_{ij} c_j^{q-1} = \frac{c_i^q}{q} i = 1, \ldots, s, \quad (23)$$

$q = 1, 2, \ldots, \eta;$ $$D(\zeta): \sum_{i=1}^{s} b_i c_i^{q-1} a_{ij} = \frac{b_j}{q}(1 - c_j^q) j = 1, \ldots, s \quad (24)$$

$q = 1, 2, \ldots, \zeta.$

Note that for p=1, B(p) reduces to $$\sum_{i=1}^{s} b_i = 1, \quad (25)$$

which is the condition for any Runge-Kutta method to be consistent and convergent, a pre-requisite for its use. Gauss-Legendre IRK methods achieve the highest possible order (p=2s). Their Radau IA and IIA variants achieve order p=2s−1, and their Lobatto IIIA, IIIB, and IIIC variants achieve order p=2s−2. Gauss-Chebyshev IRK methods are order p=s while the order of a generalized Gauss-Legendre method is between zero and 2s depending upon the choice of band limit. Note that an IRK method with all $c_i$ different and of order at least η is a collocation method if C(η) is true.

Modern methods for solving ODEs estimate and control the error by adjusting the step size accordingly. For higher order methods such as those needed for orbit propagation, rigorous error bounds become unpractical, and it is therefore necessary to consider the first non-zero term in the Taylor expansion of the error as was implied by (21). Even so, one cannot simply compute the global error (without access to the true solution), that is, the error of the computed solution after several steps. Rather, the local error committed at each step of the method can be estimated and used to adjust the step size, keeping in mind that local errors are accumulated and transported to the final state. Ideally, local error control results in global error control, and the method takes the largest time steps possible without committing too much error. Hence, the method does just the right amount of work solving the IVP.

After each step of an adaptive Runge-Kutta method, an estimate of the local error is sought. One possibility is to use a technique called Richardson extrapolation, whereby two solutions are computed using a Runge-Kutta method of order p. The first solution is computed by taking a single step of size h and the second solution is computed by taking n steps of size $h_1, h_2, \ldots, h_n$, where $h_1+h_2+\ldots+h_n=h$. The results can then be used to estimate the error of the method having taken a single step. A second possibility is to compute the solution at different but comparable orders with the same step size, and subtract the result. Error estimation can therefore be expensive owing to the cost of computing the solution more than once over a give step. The traditional method for reducing the cost of error estimation involves embedding an error estimate within the integration tableau. However, for an s-stage IRK method, the order of the embedded method can be at most s−1. Since the order of the non-embedded method can be up to 2s, this approach can be unsatisfactory. An alternative approach is presented in Section IV.

II—Propagation of the First State

Figure 1:
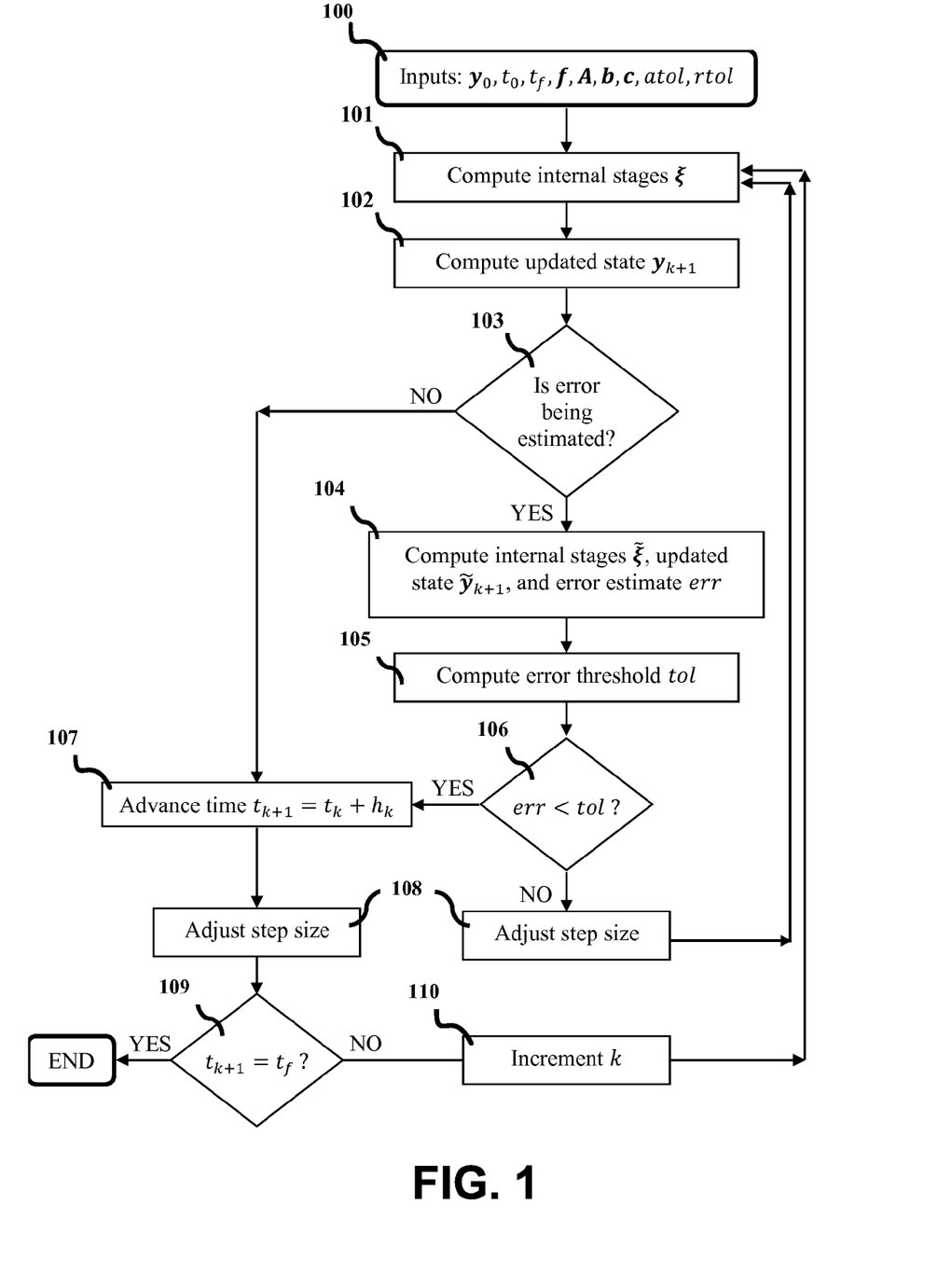
FIG. 1 is a flowchart illustrating an exemplary process for propagating the first state in an initial value problem ensemble using an implicit Runge-Kutta method according to one embodiment of the present invention.

FIG. 1 is a flowchart illustrating an exemplary process for propagating the first state in an initial value problem ensemble using an implicit Runge-Kutta method according to one embodiment of the present invention. According to one embodiment, reducing the computational cost of uncertainty propagation can begin at step 100 by propagating a single state, as depicted in FIG. 1, usually taken to be the state that is closest to the mean, median, or mode of the distribution of states in the IVP ensemble that characterize the uncertainty (i.e. the probability density function). Let $y_0$ denote the state to be propagated, let $[t_0, t_f]$ denote the timespan, and let the dynamics be governed by (1). If the local error is to be estimated and controlled, then let atol be the absolute tolerance, and let rtol be the relative tolerance. Otherwise, the absolute tolerance and relative tolerance are not inputs to the process.

At step 101, the system of equations defining the internal stages of an s-stage IRK method (A, b, c) over step k+1, $$\xi_i = f\left(t_k + c_i h_k, y_k + h_k \sum_{j=1}^{s} a_{ij} \xi_j\right), \quad (26)$$
$$i = 1, 2, \ldots, s,$$

can be solved using fixed-point methods, Newton's method or one of its variants. The number of iterations to solve (26) can be reduced (thereby reducing the overall computational cost) by providing a guess for $\xi_i$ that is close to the final solution for $\xi_i$. For example, analytic or semi-analytic approximations to $\xi_i$ can be used, and/or successive approximations of f during the iterations. Extrapolation techniques, wherein the solution over the previous step is extrapolated to the current step, may also be used. We note that on the first time step (k=0), $h_0$, may be provided or calculated based upon f (and possibly its derivatives) at $y_0$.

At step 102, the state of the object can be updated using the result obtained from Step 101 via:

$$y_{k+1} = y_k + h_k \sum_{i=1}^{s} b_i \xi_i. \quad (27)$$

Let p be the order of the solution for $y_{k+1}$.

At step 103, if the local error is not being estimated, accept the step, increment k, let $h_{k+1}=h_k$, and go to Step 107. Otherwise, estimate 104 the error in updating the state. This can be done by computing $\tilde{y}_{k+1}$, the state of the object at $t_{k+1}$ having order q≠p, by repeating Steps 101-102 while fixing $h_k$ and (a) using an IRK method with more stages (increasing s) or (b) using an IRK method with fewer stages (decreasing s). Either way, the iterations in Step 101 can be warm-started using the internal stages found during computation of $y_{k+1}$ after they have been interpolated to the time points of the order q method, leading to fewer iterations. An estimate for the error in $y_{k+1}$ (if p<q) or in $\tilde{y}_{k+1}$ (if p>q) can then be $$err = \|\tilde{y}_{k+1} - y_{k+1}\|, \quad (28)$$

where $\|\cdot\|$ is a suitable vector norm (e.g. a 2-norm or infinity-norm). Alternatively, one may use Richardson extrapolation or embed an error estimate into the IRK method, though the order of the error estimate may be unsatisfactorily low in the latter. Note that component-wise error estimates can also be made.

At step 105, the local error threshold tol can be computed using the absolute and relative tolerances, the state of the object, and possibly the time step. If the error in the norm of the state is being controlled, for example, then let tol=atol+rtol·$\|y_k\|$. If the error per unit step in the norm of the state is being controlled, for example, then let tol=(atol+rtol·$\|y_k\|$)·h. Regardless, the norm should be the same as the one used in Step 104. Note that the components of $y_{k+1}$ could have different tolerance requirements, and the calculation of tol would change accordingly.

At step 106, the time step can be accepted or rejected by comparing the error estimate err to the error threshold tol. Specifically, if err falls beneath this threshold, advance 107 $t_k$ to $t_k+h_k$. Otherwise, reject the step and do not advance $t_k$. Note that if the step is accepted, either $y_{k+1}$ or $\tilde{y}_{k+1}$ can be used to advance the solution. However, if p<q and $\tilde{y}_{k+1}$ is used to advance the solution, or if p>q and $y_{k+1}$ is used to advance the solution, then (28) may be an over-estimate of the local error.

At step 108, the size of the time step can be adjusted so that the next step is accepted with high probability and so that the next step is not unnecessarily small. This can be achieved by using an asymptotic result from numerical analysis: err=0 $(h_k^{min(p,q)+1})$. The next step is taken to be $$h^* = h_k \cdot fac \cdot \left(\frac{tol}{err}\right)^{\frac{1}{\nu}}, \quad (29)$$

where ν=min(p,q)+1 when using error per step control, ν=min(p,q) when using error per unit step control, and where 0<fac≤1 is a safety factor that could in general depend on p and q. If the time step was previously accepted, then $h_{k+1}$ can be taken to be h*, or if the step was previously rejected, then $h_k$ can be taken to be h*. Note that $t_k+h^*$ should not exceed $t_f$.

(when $t_f > t_0$) or fall below $t_f$ (when $t_f < t_0$), and the relative change in the time step, $h^*/h_k$, is typically restricted.

At step 109, Repeat steps 101-108 until $t_k$ reaches $t_f$ or an event has occurred (e.g. a collision has occurred). After each accepted time step, record the internal stages and size of the time step. Increment k, step 110, if the time step was accepted.

III—Propagation of the Remaining States

Figure 2:
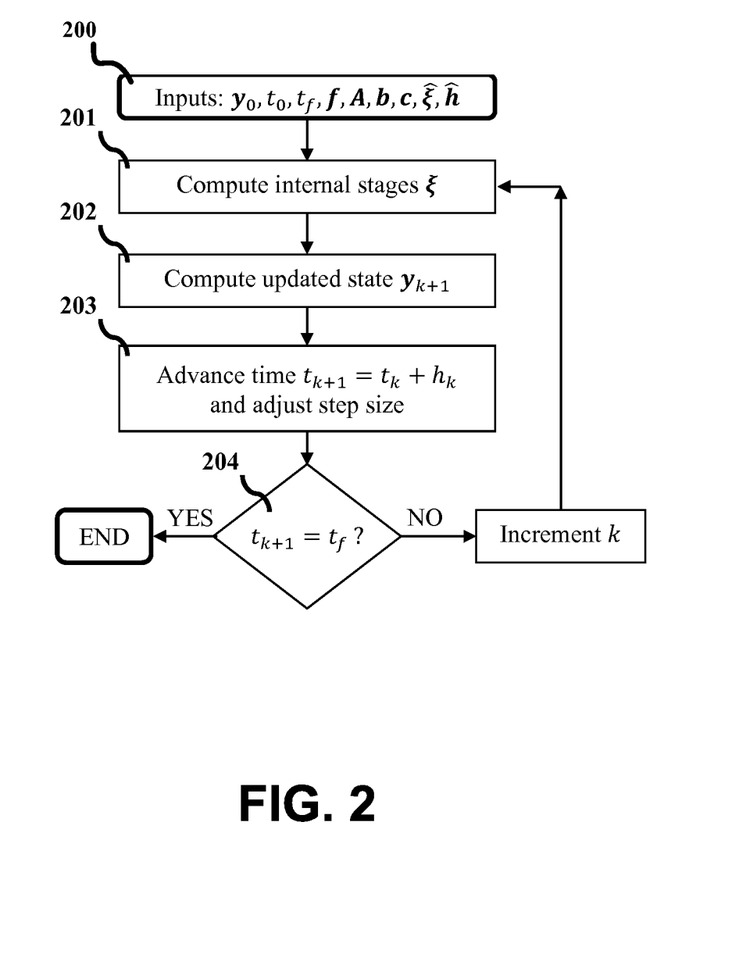
FIG. 2 is a flowchart illustrating an exemplary process for propagating the remaining states in an initial value problem ensemble using an implicit Runge-Kutta method according to one embodiment of the present invention.

Once the state of the first object has been propagated, over one or more time steps, the remaining states (which are assumed to be close in proximity to the first state) can be propagated, over one or more time steps, as depicted in FIG. 2. More specifically, FIG. 2 is a flowchart illustrating an exemplary process, beginning at Step 200, for propagating the remaining states in an initial value problem ensemble using an implicit Runge-Kutta method and based on results of propagation of the state of the first object as described above with reference to FIG. 1. Because the underlying method is implicit, the remaining propagations can be performed at a fraction of the cost. Information from the first propagation (the internal stages $\hat{\xi}$ and time step $\hat{h}$ for each accepted time step) can be used to accelerate the convergence of the iterations for the internal stages. Moreover, the error estimates can be re-used, thereby eliminating the possibility of a step being rejected and computational resources being wasted. For each of the remaining propagations, (each having of a different initial state $y_0$) the method can comprise four steps.

At step 201 and using input, Step 200, of the first state, the process can begin with solving the system of equations defining the internal stages of an s-stage IRK method (A, b, c) over step k+1, $$\xi_i = f\left(t_k + c_i h_k, y_k + h_k \sum_{j=1}^{s} a_{ij} \xi_j\right), \quad (30)$$
$$i = 1, 2, \ldots s,$$

using fixed-point methods, Newton's method or one of its variants. Analytic, semi-analytic, or successive approximations to $\xi$ and/or f or extrapolation techniques can be used to warm-start the iterations. In addition, since this state is not the first to be propagated, the internal stages that were recorded during propagation of previous states can also be used. The number of iterations required to solve for the internal stages can be monitored and used to determine if the number of iterations required to solve for the internal stages surpasses the number needed during propagation of the first state over the same time step. If so, the process can revert to that approach. On the first step, let $h_0$, be that during propagation of the first state.

At step 202, the state of the object can be updated using the result obtained from Step 201 via:

$$y_{k+1} = y_k + h_k \sum_{i=1}^{s} b_i \xi_i. \quad (31)$$

At step 203, the time step can be advanced and the time step size can be adjusted by looking-up the step size that was taken during propagation of the first state. In doing so, the error need not be re-estimated and all steps are accepted.

At step 204, steps 201-203 can be repeated until $t_k$ reaches $t_f$ or an event has occurred (e.g. a collision has occurred). On each iteration, k can be incremented 205.

Once the remaining states have been propagated, the ensemble of propagated states can be used to recover and characterize the uncertainty in the state of the object at time $t_f$.

IV—Error Estimation

Figure 3:
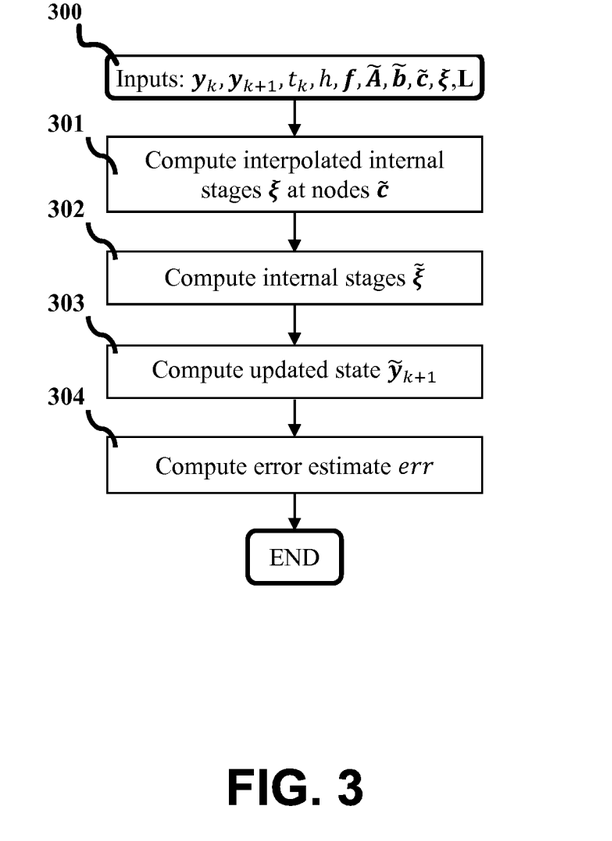
FIG. 3 is a flowchart illustrating an exemplary process for estimating the error in a state that is propagated using an implicit Runge-Kutta method according to one embodiment of the present invention.

In one embodiment of the present invention, the IRK method can be collocation-based. For the case of Gauss-Legendre IRK (and its Radau and Lobatto variants), an embedded error estimate would grossly over-predict the local error. Instead, the local error can be estimated by computing the IRK step twice but with two different order IRK methods having comparable orders. Suppose that the first IRK method (A, b, c) has order p, and the second IRK method ($\tilde{A}$, $\tilde{b}$, $\tilde{c}$) has order q. Ideally, p and q differ by 1. FIG. 3 is a flowchart illustrating an exemplary process for estimating the error in a state that is propagated using an implicit Runge-Kutta method according to one embodiment of the present invention.

At step 301 and as illustrated in FIG. 3, using as input, Step 300, the updated state $y_{k+1}$ and internal stages $\xi$ of the p-order IRK method over step k+1, a guess can be computed for the internal stages of the q-order IRK method by interpolating the internal stages $\xi$ to the nodes of the q-order method. This can be done by multiplying the interpolation matrix $\Psi^{-1}$ by L, where $L_{i,j} = F_j(\tilde{c}_i)$, and $F_j$ is the $j^{th}$ order basis function (associated with the IRK methods) evaluated at node $\tilde{c}_i$ in $\tilde{c}$. The interpolation matrix can be pre-computed, and if the p- and q-order IRK methods are selected a-priori, then the matrix product $L\Psi^{-1}$, can also be pre-computed. Finally, compute the guess $L\Psi^{-1}\xi$ for the internal stages of the q-order IRK method.

At step 302, the process can continue with solving the system of equations defining the internal stages $\tilde{\xi}$ of the s-stage, q-order IRK method over step k+1, $$\tilde{\xi}_i = f\left(t_k + \tilde{c}_i h_k, y_k + h_k \sum_{j=1}^{s} \tilde{a}_{ij} \tilde{\xi}_j\right), \quad (32)$$
$$i = 1, 2, \ldots, s,$$

using fixed-point methods, Newton's method or one of its variants. Rather than using analytic, semi-analytic, or successive approximations of f or extrapolation techniques to warm-start the iterations, use the internal stages found in Step 301 as a guess to warm-start the iterations.

At step 303, the state of the object can be updated using the result obtained from Step 301 via:

$$\tilde{y}_{k+1} = y_k + h_k \sum_{i=1}^{s} \tilde{b}_i \tilde{\xi}_i. \quad (33)$$

At step 304, a calculation can be made of the local error estimate err=$\|\tilde{y}_{k+1} - y_{k+1}\|$ corresponding to the error in $y_{k+1}$ (if p<q) or in $\tilde{y}_{k+1}$ (if p>q).

Since interpolation of the internal stages in Step 301 requires only a single matrix-matrix multiplication, and since the iterations in Step 302 can be warm-started, the computational cost of error estimation (and uncertainty propagation) is significantly reduced using this approach.

EXAMPLES

Embodiments of the present invention can be applied to the problem of propagating the uncertainty in the state of an object that is orbiting around the Earth. This can be done by solving an initial value problem ensemble containing initial conditions that include the state of the object and a number of neighboring states, together which characterize the uncertainty in the state of the orbiting object. Evaluation of the right-hand-side of the ordinary differential equation (1) dominates the computational cost of propagation. Thus, the number of these function evaluations is used to quantify the overall performance in these examples. During propagation of the first state, J2-gravity, a fast, low-fidelity approximation to the dynamics, is used to warm-start the iterations for the stage equations, which are expressed as in (10).

Figure 4:
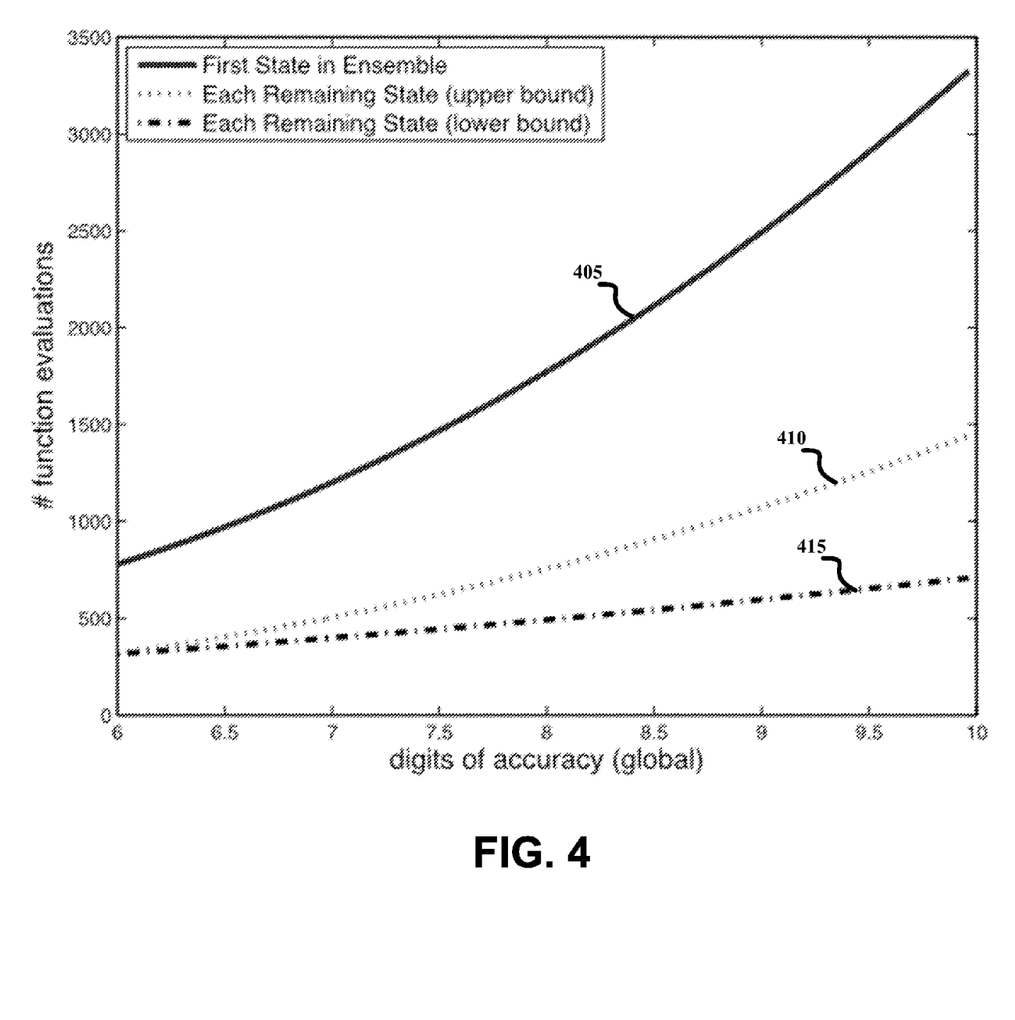
FIG. 4 is a graph illustrating an exemplary computational cost of uncertainty propagation for an object in low Earth orbit for a given global accuracy.

A first example can be based on the propagation of the uncertainty in the state of an object that is in low Earth orbit with an altitude of 1500 km. In this example, a degree and order 36 Earth Gravity Model is used to describe the dynamics, and the uncertainty is propagated for 15 hours (approximately 10 orbital periods). Truth is generated using a high-accuracy 50-stage Gauss-Legendre implicit Runge-Kutta (IRK) method with a relative local accuracy of 13 digits. FIG. 4 is a graph illustrating exemplary computational cost of uncertainty propagation for such an object in low Earth orbit for a given global accuracy. More specifically, FIG. 4 demonstrates, for a given global accuracy, the cost of propagating the first state and each remaining state (the number of which depends upon the way in which uncertainty is characterized) using an adaptive 5-stage Gauss-Legendre IRK method with error per unit step control. By exploiting the proximity of the orbital states, the computational cost of propagating each remaining state is less than that of propagating the first state represented by the solid curve 405. The dashed 410 and dashed-dotted 415 curves provide bounds on the cost of propagating each remaining state. At best as represented by the dash-dotted curve 415, only a single iteration is necessary to solve the system of equations for the internal stages. At worst, multiple iterations are required. Regardless, step rejection does not occur, and the error estimate from propagation of the first state can be reused. As a result, the overall cost of propagating each remaining state is less than that of propagating the first state, even in the worst case. Had traditional IRK methods for uncertainty propagation been used, the cost of propagating each remaining state would equal that of propagating the first state as represented by the solid curve 405.

Figure 5:
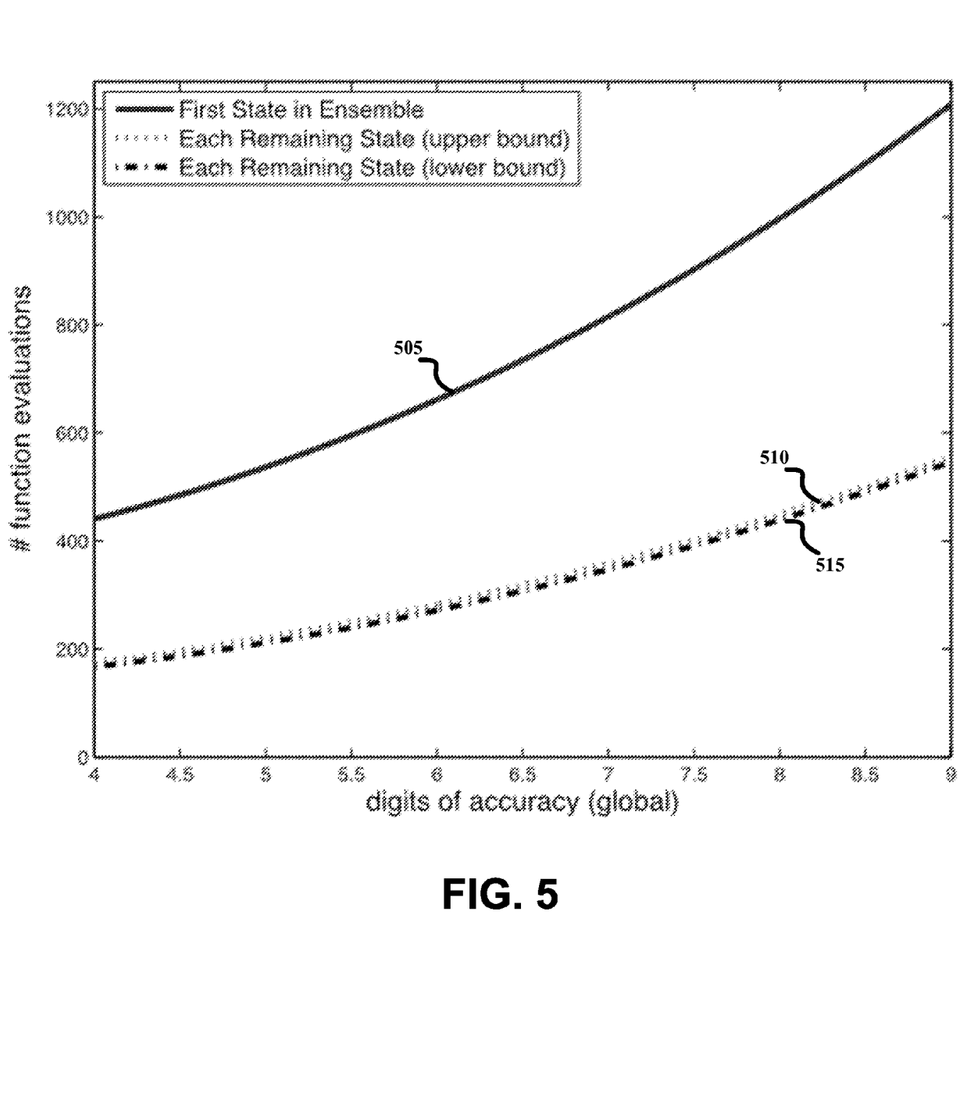
FIG. 5 is a graph illustrating an exemplary computational cost of uncertainty propagation for an object in geosynchronous orbit for a given global accuracy.

FIG. 5 is a graph illustrating exemplary computational cost of uncertainty propagation for an object in geosynchronous orbit for a given global accuracy. In this second example, a degree and order 12 Earth Gravity Model is used to describe the dynamics, and the uncertainty is propagated for 10 days. FIG. 5 demonstrates, for a given global accuracy, the cost of propagating the first state and each remaining state using a 5-stage Gauss-Legendre IRK method with error per unit step control. Again, by exploiting the proximity of the orbital states, the computational cost of propagating each remaining state as represented by the dashed curve 510 and dash-dotted curve 515 is less than that of propagating the first state as represented by the solid curve 505.

Figure 6:
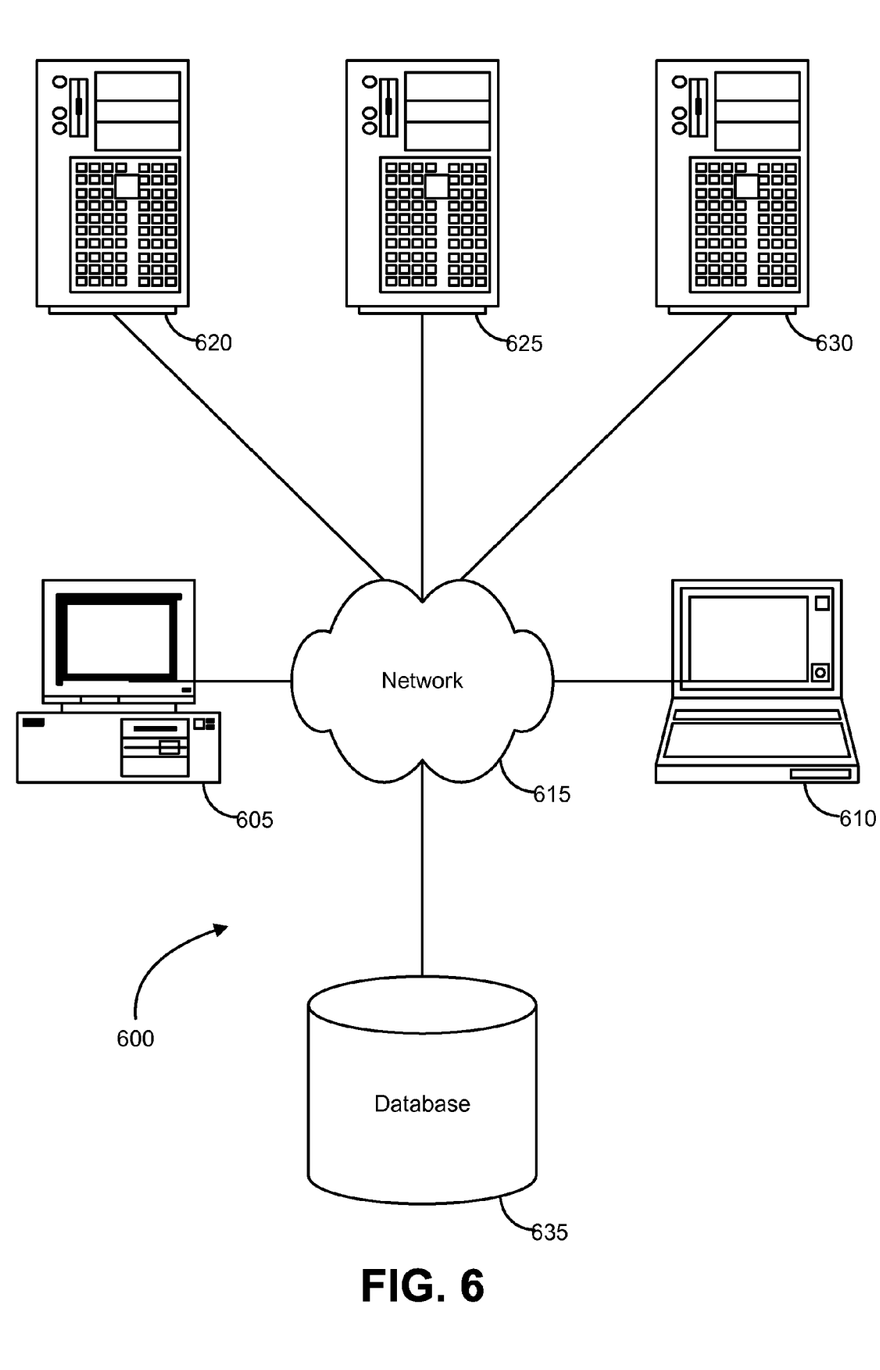
FIG. 6 is a block diagram illustrating components of an exemplary operating environment in which various embodiments of the present invention may be implemented.

FIG. 6 is a block diagram illustrating components of an exemplary operating environment in which various embodiments of the present invention may be implemented. The system 600 can include one or more user computers 605, 610, which may be used to operate a client, whether a dedicated application, web browser, etc. The user computers 605, 610 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 605, 610 may also have any of a variety of applications, including one or more development systems, database client and/or server applications, and web browser applications. Alternatively, the user computers 605, 610 may be any other electronic device, such as a thin-client computer, Internet-enabled mobile telephone, and/or personal digital assistant, capable of communicating via a network (e.g., the network 615 described below) and/or displaying and navigating web pages or other types of electronic documents. Although the exemplary system 600 is shown with two user computers, any number of user computers may be supported.

In some embodiments, the system 600 may also include a network 615. The network can be any type of network familiar to those skilled in the art that can support data communications using any of a variety of commercially-available protocols, including without limitation TCP/IP, SNA, IPX, AppleTalk, and the like. Merely by way of example, the network 615 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 620, 625, 630 which can be general purpose computers and/or specialized server computers (including, merely by way of example, PC servers, UNIX servers, mid-range servers, mainframe computers rack-mounted servers, etc.). One or more of the servers (e.g., 630) may be dedicated to running applications, such as a business application, a web server, application server, etc. Such servers may be used to process requests from user computers 605, 610. The applications can also include any number of applications for controlling access to resources of the servers 620, 625, 630.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 605, 610. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 605, 610.

In some embodiments, an application server may create web pages dynamically for displaying on an end-user (client) system. The web pages created by the web application server may be forwarded to a user computer 605 via a web server. Similarly, the web server can receive web page requests and/ or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 600 may also include one or more databases 635. The database(s) 635 may reside in a variety of locations. By way of example, a database 635 may reside on a storage medium local to (and/or resident in) one or more of the computers 605, 610, 615, 625, 630. Alternatively, it may be remote from any or all of the computers 605, 610, 615, 625, 630, and/or in communication (e.g., via the network 620) with one or more of these. In a particular set of embodiments, the database 635 may reside in a storage-area network ("SAN") familiar to those skilled in the art. Similarly, any necessary files for performing the functions attributed to the computers 605, 610, 615, 625, 630 may be stored locally on the respective computer and/or remotely, as appropriate. In one set of embodiments, the database 635 may be a relational database, such as Oracle 10g, that is adapted to store, update, and retrieve data in response to SQL-formatted commands.

Figure 7:
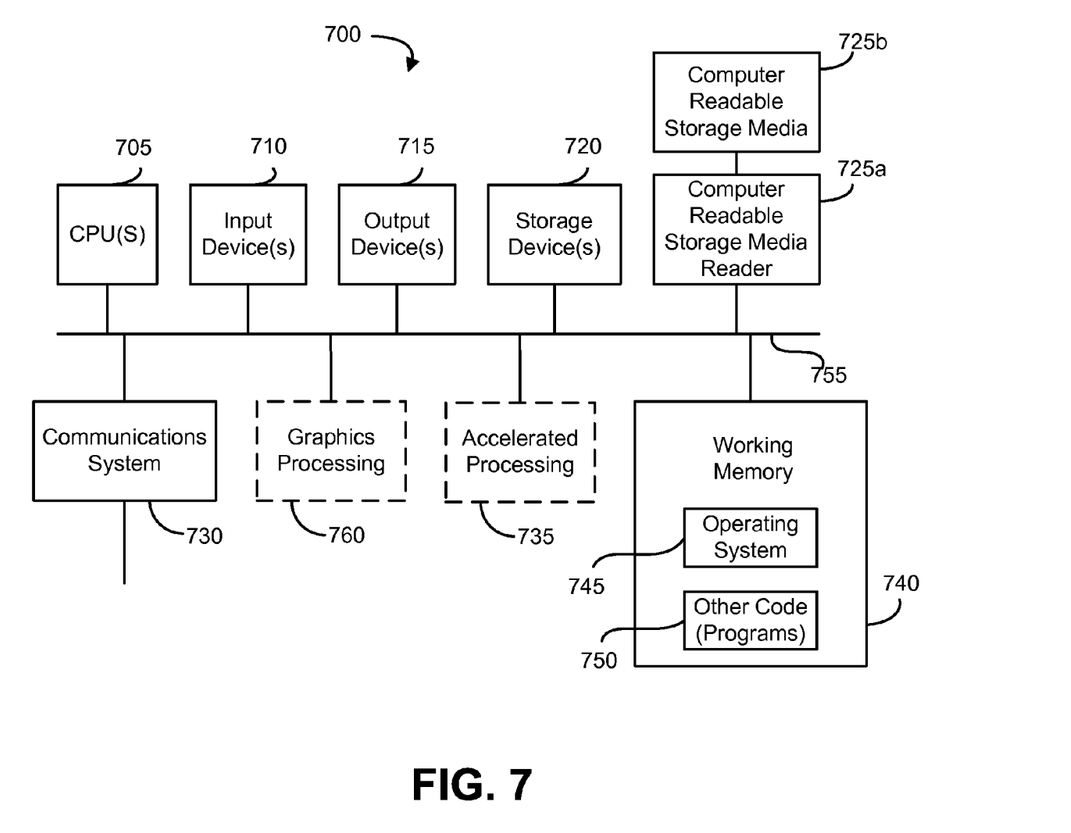
FIG. 7 is a block diagram illustrating an exemplary computer system in which embodiments of the present invention may be implemented.

FIG. 7 illustrates an exemplary computer system 700, in which various embodiments of the present invention may be implemented. The system 700 may be used to implement any of the computer systems described above. The computer system 700 is shown comprising hardware elements that may be electrically coupled via a bus 755. The hardware elements may include one or more central processing units (CPUs) 705, one or more graphics processing units (GPUs) 760 one or more input devices 710 (e.g., a mouse, a keyboard, etc.), and one or more output devices 715 (e.g., a display device, a printer, etc.). The computer system 700 may also include one or more storage device 720. By way of example, storage device(s) 720 may be disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 725a, a communications system 730 (e.g., a modem, a network card (wireless or wired), an infra-red communication device, etc.), and working memory 740, which may include RAM and ROM devices as described above. In some embodiments, the computer system 700 may also include a accelerated processing unit 735, which can include a DSP, a special-purpose processor and/or the like.

The computer-readable storage media reader 725a can further be connected to a computer-readable storage medium 725b, together (and, optionally, in combination with storage device(s) 720) comprehensively representing remote, local, fixed, and/or removable storage devices plus storage media for temporarily and/or more permanently containing computer-readable information. The communications system 730 may permit data to be exchanged with the network 720 and/or any other computer described above with respect to the system 700.

The computer system 700 may also comprise software elements, shown as being currently located within a working memory 740, including an operating system 745 and/or other code 750, such as an application program (which may be a client application, web browser, mid-tier application, RDBMS, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed. Software of computer system 700 may include code 750 for implementing embodiments of the present invention as described herein.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for propagating the state of an object and an uncertainty associated with the state of the object, the method comprising:
    receiving, by a computer system, an interval of time over which the uncertainty is to be propagated, as well as an ensemble of initial conditions that characterize the initial uncertainty associated with the state of an object and an ordinary differential equation (ODE) describing dynamics of the state of the object, which together define an initial value problem (IVP) ensemble, for the object, the IVP ensemble comprising a plurality of IVPs;
    solving, by the computer system, the IVPs in the IVP ensemble wherein the solution of one or more of the IVPs in the IVP ensemble depends upon the solution of one or more of the other IVPs in the IVP ensemble;
    characterizing, by the computer system, the uncertainty associated with the state of the object at the end of the time interval based on solving the IVPs in the IVP ensemble.

2. The method of claim 1, wherein the solution of one or more of the IVPs, over one or more time steps, is used within the process of solving one or more of the remaining IVPs, over one or more time steps.

3. The method of claim 1, wherein one or more time steps taken to solve one or more of the IVPs in the IVP ensemble are the same as one or more time steps taken to solve one or more of the remaining IVPs in the IVP ensemble.

4. The method of claim 1, wherein the solution of one or more of the IVPs, over one or more time steps, is used within the process of solving one or more of the remaining IVPs, over one or more time steps, and wherein one or more time steps taken to solve one or more of the IVPs in the IVP ensemble are the same as one or more time steps taken to solve one or more of the remaining IVPs in the IVP ensemble.

5. The method of claim 1, wherein one or more of the numerical methods used to solve one or more of the IVPs in the IVP ensemble is an implicit Runge-Kutta method.

6. The method of claim 2, wherein one or more of the numerical methods used to solve one or more of the IVPs in the IVP ensemble is an implicit Runge-Kutta method.

7. The method of claim 3, wherein one or more of the numerical methods used to solve one or more of the IVPs in the IVP ensemble is an implicit Runge-Kutta method.

8. The method of claim 4, wherein one or more of the numerical methods used to solve one or more of the IVPs in the IVP ensemble is an implicit Runge-Kutta method.

9. The method of claim 5, wherein one or more of the implicit Runge-Kutta methods is estimating and controlling the truncation error.

10. The method of claim 6, wherein one or more of the implicit Runge-Kutta methods is estimating and controlling the truncation error.

11. The method of claim 7, wherein one or more of the implicit Runge-Kutta methods is estimating and controlling the truncation error.

12. The method of claim 8, wherein one or more of the implicit Runge-Kutta methods is estimating and controlling the truncation error.

13. A system comprising:
a processor; and
a memory coupled with the processor and having stored therein a sequence of instructions which, when executed by the processor, cause the processor to propagate the state of an object and an uncertainty associated with the state of the object by:
receiving an interval of time over which the uncertainty is to be propagated, as well as an ensemble of initial conditions that characterize the initial uncertainty associated with the state of an object and an ordinary differential equation (ODE) describing dynamics of the state of the object, which together define an initial value problem (IVP) ensemble, for the object, the IVP ensemble comprising a plurality of IVPs;
solving one or more of the IVPs in the IVP ensemble wherein the solution of one or more of the IVPs in the IVP ensemble depends upon the solution of one or more of the other IVPs in the IVP ensemble; and
characterizing the uncertainty associated with the state of the object at the end of the time interval based on solving the IVPs in the IVP ensemble.

14. The system of claim 13, wherein the solution of one or more of the IVPs, over one or more time steps, is used within the process of solving one or more of the remaining IVPs, over one or more time steps.

15. The system of claim 13, wherein one or more time steps taken to solve one or more of the IVPs in the IVP ensemble are the same as one or more time steps taken to solve one or more of the remaining IVPs in the IVP ensemble.

16. The system of claim 13, wherein the solution of one or more of the IVPs, over one or more time steps, is used within the process of solving one or more of the remaining IVPs, over one or more time steps, and wherein one or more time steps taken to solve one or more of the IVPs in the IVP ensemble are the same as one or more time steps taken to solve one or more of the remaining IVPs in the IVP ensemble.

17. The system of claim 13, wherein one or more of the numerical methods used to solve one or more of the IVPs in the IVP ensemble is an implicit Runge-Kutta method.

18. The system of claim 14, wherein one or more of the numerical methods used to solve one or more of the IVPs in the IVP ensemble is an implicit Runge-Kutta method.

19. The system of claim 15, wherein one or more of the numerical methods used to solve one or more of the IVPs in the IVP ensemble is an implicit Runge-Kutta method.

20. The system of claim 16, wherein one or more of the numerical methods used to solve one or more of the IVPs in the IVP ensemble is an implicit Runge-Kutta method.

21. The system of claim 17, wherein one or more of the implicit Runge-Kutta methods is estimating and controlling the truncation error.

22. The system of claim 18, wherein one or more of the implicit Runge-Kutta methods is estimating and controlling the truncation error.

23. The system of claim 19, wherein one or more of the implicit Runge-Kutta methods is estimating and controlling the truncation error.

24. The system of claim 20, wherein one or more of the implicit Runge-Kutta methods is estimating and controlling the truncation error.

25. A computer-readable memory having stored therein a sequence of instructions which, when executed by a processor, cause the processor to propagate the state of an object and an uncertainty associated with the state of the object by:
receiving an interval of time over which the uncertainty is to be propagated, as well as an ensemble of initial conditions that characterize the initial uncertainty associated with the state of an object and an ordinary differential equation (ODE) describing dynamics of the state of the object, which together define an initial value problem (IVP) ensemble, for the object, the IVP ensemble comprising a plurality of IVPs;
solving one or more of the IVPs in the IVP ensemble wherein the solution of one or more of the IVPs in the IVP ensemble depends upon the solution of one or more of the other IVPs in the IVP ensemble; and
characterizing the uncertainty associated with the state of the object at the end of the time interval based on solving the IVPs in the IVP ensemble.

26. The computer-readable memory of claim 25, wherein the solution of one or more of the IVPs, over one or more time steps, is used within the process of solving one or more of the remaining IVPs, over one or more time steps.

27. The computer-readable memory of claim 25, wherein one or more time steps taken to solve one or more of the IVPs in the IVP ensemble are the same as one or more time steps taken to solve one or more of the remaining IVPs in the IVP ensemble.

28. The computer-readable memory of claim 25, wherein the solution of one or more of the IVPs, over one or more time steps, is used within the process of solving one or more of the remaining IVPs, over one or more time steps, and wherein one or more time steps taken to solve one or more of the IVPs in the IVP ensemble are the same as one or more time steps taken to solve one or more of the remaining IVPs in the IVP ensemble.

29. The computer-readable memory of claim 25, wherein one or more of the numerical methods used to solve one or more of the IVPs in the IVP ensemble is an implicit Runge-Kutta method.

30. The computer-readable memory of claim 26, wherein one or more of the numerical methods used to solve one or more of the IVPs in the IVP ensemble is an implicit Runge-Kutta method.

31. The computer-readable memory of claim 27, wherein one or more of the numerical methods used to solve one or more of the IVPs in the IVP ensemble is an implicit Runge-Kutta method.

32. The computer-readable memory of claim 28, wherein one or more of the numerical methods used to solve one or more of the IVPs in the IVP ensemble is an implicit Runge-Kutta method.

33. The computer-readable memory of claim 29, wherein one or more of the implicit Runge-Kutta methods is estimating and controlling the truncation error.

34. The computer-readable memory of claim 30, wherein one or more of the implicit Runge-Kutta methods is estimating and controlling the truncation error.

35. The computer-readable memory of claim 31, wherein one or more of the implicit Runge-Kutta methods is estimating and controlling the truncation error.

36. The computer-readable memory of claim 32, wherein one or more of the implicit Runge-Kutta methods is estimating and controlling the truncation error.

* * * * *